No. 876,191. PATENTED JAN. 7, 1908.
J. JACKSON.
VEHICLE WHEEL TIRE.
APPLICATION FILED DEC. 8, 1906.
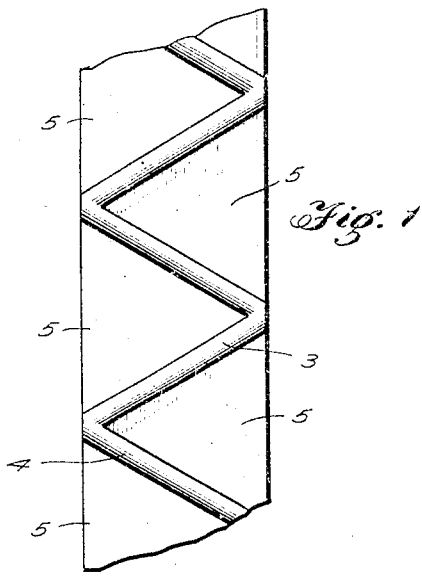
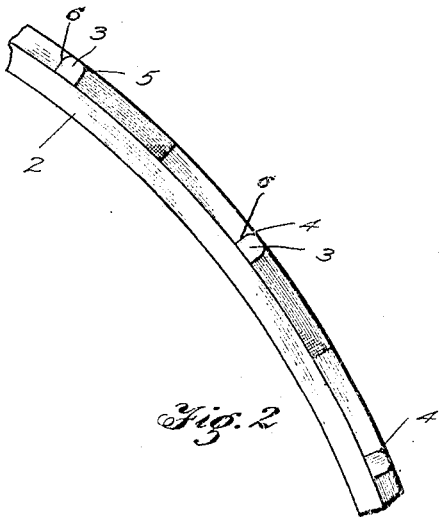
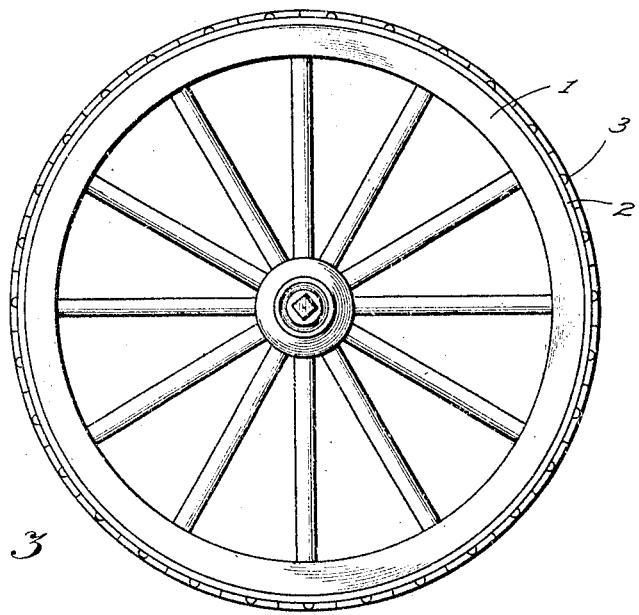
Inventor
James Jackson
Witnesses
By Victor J. Evans
Attorney

UNITED STATES PATENT OFFICE.

JAMES JACKSON, OF GREGORY, MICHIGAN.

VEHICLE-WHEEL TIRE.

No. 876,191.  Specification of Letters Patent.  Patented Jan. 7, 1908.

Application filed December 8, 1906. Serial No. 346,906.

*To all whom it may concern:*

Be it known that I, JAMES JACKSON, a citizen of the United States of America, residing at Gregory, in the county of Livingston and State of Michigan, have invented new and useful Improvements in Vehicle-Wheel Tires, of which the following is a specification.

This invention relates to vehicle wheel tires, and is designed more particularly for use upon wooden wheels for automobiles or other similar wheeled vehicles.

The principal object of my invention is to provide a steel tire for wooden vehicle wheels which shall be provided with means for preventing the slipping of the wheel, and which will also be provided with means for preventing mud, snow or ice, from clinging to the tire.

Another object of my invention is to provide a vehicle wheel tire with a projecting zigzag rib forming V-shaped plain surfaces at opposite sides of the tire in order that clay, mud, snow or ice will be crowded outwardly and away from the tire to prevent the same from clinging to and clogging the tire.

The invention consists in the construction and arrangement of parts, as will be hereinafter described and particularly pointed out in the claim.

In the accompanying drawings, Figure 1 is a fragmentary plan view of a portion of the tire made in accordance with my invention. Fig. 2 is a fragmentary side elevation of portion of a tire made in accordance with my invention. Fig. 3 is a side elevation of a wooden wheel having a tire, made in accordance with my invention, fitted thereto.

Referring to the drawing for a more particular description of my invention, the numeral 1 designates a wooden wheel of the usual or any preferred construction. The tire forming the subject matter of this invention consists of a steel band 2 of suitable thickness and provided upon its outer face is a continuous zigzag rib 3 extending throughout the tread surface of the tire. The rib 3 is provided with opposite vertical side walls 6 which terminate at their upper ends with rounded corners 4, as shown more particularly in Fig. 2, and the spaces between the zigzag portions of the rib 3 are substantially V-shaped, as shown at 5, said V-shaped intermediate spaces opening alternately outward toward the outer edge of the tire. The bearing surface of the rib 3 is plain and of equal height transversely of the tire.

A tire made in accordance with my invention and applied to a wheel will not permit snow, ice, clay or mud to stick to the tire, owing to the disposition of the spaces 5 which open out at opposite sides of the tire, and the rib 3 having the vertical opposite side walls 6 which permits the accumulating substance to be crowded out at opposite sides of the tire.

Having thus described the invention, what I claim is:

A wheel tire comprising a band having on its bearing surface a rib which is spaced apart in V-shaped form and provided with opposite vertical side walls which terminate in rounded bearing surfaces, said rib serving to extend continuously across said band and having its ends terminating flush with the opposite side edges of said band, substantially as specified.

In testimony whereof, I affix my signature in presence of two witnesses.

JAMES JACKSON.

Witnesses:
WILLIAM H. TYLER,
H. W. BENTER.